US011323435B2

(12) United States Patent
Ya et al.

(10) Patent No.: US 11,323,435 B2
(45) Date of Patent: May 3, 2022

(54) METHOD AND APPARATUS FOR ADVANCED SECURITY SYSTEMS OVER A POWER LINE CONNECTION

(71) Applicant: THE BOEING COMPANY, Chicago, IL (US)

(72) Inventors: Sopheap Ya, Renton, WA (US); Nha Thanh Nguyen, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 226 days.

(21) Appl. No.: 16/406,958

(22) Filed: May 8, 2019

(65) Prior Publication Data
US 2020/0358761 A1    Nov. 12, 2020

(51) Int. Cl.
*H04L 9/40*    (2022.01)
*G06F 21/60*   (2013.01)
(Continued)

(52) U.S. Cl.
CPC ........ *H04L 63/0861* (2013.01); *G06F 21/602* (2013.01); *H04B 3/542* (2013.01);
(Continued)

(58) Field of Classification Search
CPC ....... G06F 21/44; G06F 21/602; H04B 3/542; H04L 2209/84; H04L 2463/082;
(Continued)

(56) References Cited

U.S. PATENT DOCUMENTS 3,470,787 A   10/1969  Mackie
3,909,821 A    9/1975  Jagoda et al.
(Continued)

FOREIGN PATENT DOCUMENTS

CN    1201274 A    12/1998
CN    1309479 A     8/2001
(Continued)

OTHER PUBLICATIONS

Search Query Report from IP.com (performed Apr. 21, 2021) (Year: 2021).*
(Continued)

*Primary Examiner* — Sharon S Lynch
(74) *Attorney, Agent, or Firm* — Armstrong Teasdale LLP

(57) ABSTRACT

A multifactor authentication system onboard a vehicle including at least one processor, a first database, a second database, and one or more protected computer systems is provided. The at least one processor is programmed to receive, from a user, a request for access to the one or more protected computer systems, wherein the request contains authentication information including a first authentication factor and a second authentication factor, retrieve first factor authentication data associated with the user from the first database, compare the first factor authentication data with the received first authentication factor to determine if there is a match, retrieve the second factor authentication data associated with the user from the second database, compare the second factor authentication data with the received second authentication factor to determine if there is a match, and grant access to the one or more protected computer systems if all of the comparisons match.

20 Claims, 8 Drawing Sheets

(51) Int. Cl.
*H04L 9/32* (2006.01)
*H04B 3/54* (2006.01)
*H04W 12/06* (2021.01)
*H04L 67/12* (2022.01)
*H04L 29/06* (2006.01)

(52) U.S. Cl.
CPC ........ *H04L 9/3231* (2013.01); *H04L 63/0853* (2013.01); *H04W 12/06* (2013.01); *H04L 63/083* (2013.01); *H04L 67/12* (2013.01); *H04L 2209/84* (2013.01); *H04L 2463/082* (2013.01)

(58) Field of Classification Search
CPC ............... H04L 63/083; H04L 63/0853; H04L 63/0861; H04L 67/12; H04L 9/3231; H04W 12/00; H04W 12/06
See application file for complete search history.

(56) References Cited

U.S. PATENT DOCUMENTS

| | | | |
|---|---|---|---|
| 3,914,015 | A | 10/1975 | McCartney |
| 4,158,478 | A | 6/1979 | D'Auria et al. |
| 4,568,145 | A | 2/1986 | Colin et al. |
| 4,684,825 | A | 8/1987 | Sachs |
| 4,695,127 | A | 9/1987 | Ohlhaber et al. |
| 4,867,527 | A | 9/1989 | Dotti et al. |
| 4,886,405 | A | 12/1989 | Blomberg |
| 4,895,426 | A | 1/1990 | Pinson |
| 4,896,939 | A | 1/1990 | O'Brien |
| 4,973,940 | A | 11/1990 | Sakai et al. |
| 5,048,914 | A | 9/1991 | Sneddon |
| 5,140,659 | A | 8/1992 | Minds et al. |
| 5,241,283 | A | 8/1993 | Sutterlin |
| 5,349,644 | A | 9/1994 | Massey et al. |
| 5,351,272 | A | 9/1994 | Abraham |
| 5,391,932 | A | 2/1995 | Small et al. |
| 5,574,815 | A | 11/1996 | Kneeland |
| 5,918,013 | A | 6/1999 | Mighdoll et al. |
| 5,929,750 | A | 7/1999 | Brown |
| 6,040,759 | A | 3/2000 | Sanderson |
| 6,100,811 | A * | 8/2000 | Hsu ................. B60H 1/00642 340/426.36 |
| 6,107,973 | A | 8/2000 | Knop et al. |
| 6,119,096 | A * | 9/2000 | Mann ................. G06Q 20/341 705/5 |
| 6,396,393 | B2 | 5/2002 | Yuasa |
| 6,480,510 | B1 | 11/2002 | Binder |
| 6,533,466 | B1 | 3/2003 | Smith |
| 6,751,979 | B2 | 6/2004 | Leathers |
| 6,879,237 | B1 | 4/2005 | Viarouge et al. |
| 6,940,396 | B2 | 9/2005 | Hammond et al. |
| 6,965,302 | B2 | 11/2005 | Mollenkopf et al. |
| 6,965,303 | B2 | 11/2005 | Mollenkopf |
| 6,980,090 | B2 | 12/2005 | Mollenkopf |
| 6,980,091 | B2 | 12/2005 | White et al. |
| 6,995,658 | B2 | 2/2006 | Tustison et al. |
| 6,998,962 | B2 | 2/2006 | Cope et al. |
| 7,064,654 | B2 | 6/2006 | Berkman et al. |
| 7,075,414 | B2 | 7/2006 | Giannini et al. |
| 7,098,773 | B2 | 8/2006 | Berkman |
| 7,102,490 | B2 | 9/2006 | Flen et al. |
| 7,260,389 | B2 | 8/2007 | Allen et al. |
| 7,362,936 | B2 | 4/2008 | Stark et al. |
| 7,406,368 | B2 * | 7/2008 | Arnouse ................. G08G 5/0013 701/3 |
| 7,412,840 | B2 | 8/2008 | Leathers |
| 7,461,516 | B2 | 12/2008 | Leadingham et al. |
| 7,515,797 | B2 | 4/2009 | Stark et al. |
| 7,515,798 | B2 | 4/2009 | Stark et al. |
| 7,523,889 | B2 | 4/2009 | Bourjac et al. |
| 7,546,123 | B2 | 6/2009 | Wright et al. |
| 7,636,568 | B2 | 12/2009 | Gould et al. |
| 7,749,030 | B1 | 7/2010 | Smith |
| 7,769,376 | B2 | 8/2010 | Wright et al. |
| 7,802,724 | B1 | 9/2010 | Nohr |
| 7,840,770 | B2 | 11/2010 | Larson et al. |
| 7,893,557 | B2 | 2/2011 | Davis et al. |
| 7,908,042 | B2 | 3/2011 | Brinkley et al. |
| 7,965,480 | B2 | 6/2011 | Crawley et al. |
| 7,970,410 | B2 | 6/2011 | Brinkley et al. |
| 8,094,605 | B2 | 1/2012 | Lynch et al. |
| 8,194,789 | B2 | 6/2012 | Wolter et al. |
| 8,335,062 | B2 | 12/2012 | Haines et al. |
| 8,504,019 | B2 | 8/2013 | Lynch et al. |
| 8,611,824 | B2 | 12/2013 | Ichikawa |
| 8,942,865 | B2 | 1/2015 | Kumar et al. |
| 8,948,934 | B2 | 2/2015 | Lee et al. |
| 9,083,581 | B1 * | 7/2015 | Addepalli ............... H04W 8/06 |
| 9,100,104 | B2 | 8/2015 | Nguyen et al. |
| 9,295,032 | B2 | 3/2016 | Kumar et al. |
| 9,306,625 | B2 | 4/2016 | Lee |
| 9,350,423 | B2 | 5/2016 | Mitchell et al. |
| 9,425,859 | B2 | 8/2016 | Mitchell et al. |
| 9,436,569 | B2 | 9/2016 | Lee et al. |
| 9,515,700 | B2 | 12/2016 | Sampigethaya et al. |
| 9,667,316 | B2 | 5/2017 | Nguyen et al. |
| 9,667,338 | B2 | 5/2017 | Shelton et al. |
| 9,673,863 | B2 | 6/2017 | Mitchell et al. |
| 9,847,796 | B2 | 12/2017 | Shelton et al. |
| 9,876,533 | B2 | 1/2018 | Lee et al. |
| 9,930,529 | B2 | 3/2018 | Mitchell et al. |
| 9,990,785 | B2 * | 6/2018 | God ........................ G07C 9/27 |
| 10,084,550 | B2 | 9/2018 | Lee et al. |
| 10,219,154 | B1 * | 2/2019 | Hallock ................ H04L 63/083 |
| 10,343,650 | B1 * | 7/2019 | Ahmad ............... G07C 9/00309 |
| 10,498,727 | B1 * | 12/2019 | Sherif ................... H04W 12/06 |
| 10,538,220 | B1 * | 1/2020 | Tyagi ................. G07C 9/00309 |
| 10,541,725 | B1 | 1/2020 | Nguyen et al. |
| 10,643,266 | B2 * | 5/2020 | Isaacson ................... G07G 1/01 |
| 10,664,413 | B2 * | 5/2020 | Fons .................... G06F 12/1408 |
| 10,681,040 | B2 * | 6/2020 | Sherif .................... H04W 4/023 |
| 10,820,196 | B2 | 10/2020 | Nguyen et al. |
| 2001/0009021 | A1 | 7/2001 | Ellington et al. |
| 2001/0038674 | A1 | 11/2001 | Trans |
| 2002/0141440 | A1 | 10/2002 | Stanley et al. |
| 2002/0160773 | A1 | 10/2002 | Gresham et al. |
| 2003/0045970 | A1 | 3/2003 | Maryanka |
| 2003/0051060 | A1 | 3/2003 | Vitenberg |
| 2003/0093187 | A1 | 5/2003 | Walker |
| 2003/0208764 | A1 | 11/2003 | Galipeau et al. |
| 2003/0215197 | A1 | 11/2003 | Simon et al. |
| 2004/0004130 | A1 | 1/2004 | Rotta |
| 2004/0008633 | A1 | 1/2004 | Youn |
| 2004/0061380 | A1 | 4/2004 | Hann et al. |
| 2004/0113757 | A1 | 6/2004 | White et al. |
| 2004/0140673 | A1 | 7/2004 | McCool |
| 2004/0161203 | A1 | 8/2004 | Cull |
| 2004/0258141 | A1 | 12/2004 | Tustison |
| 2005/0017848 | A1 | 1/2005 | Flen et al. |
| 2005/0044564 | A1 | 2/2005 | Stopniewicz et al. |
| 2005/0122999 | A1 | 6/2005 | Scherzer et al. |
| 2005/0143868 | A1 | 6/2005 | Whelan |
| 2005/0154653 | A1 | 7/2005 | Jongebloed |
| 2005/0162253 | A1 | 7/2005 | Wilson et al. |
| 2005/0194838 | A1 | 9/2005 | Wetmore |
| 2005/0219064 | A1 * | 10/2005 | Arnouse ................. G08G 5/0013 340/945 |
| 2006/0019609 | A1 | 1/2006 | Finley et al. |
| 2006/0046715 | A1 | 3/2006 | Burgemeister |
| 2006/0049694 | A1 | 3/2006 | Kates |
| 2006/0114925 | A1 | 6/2006 | Gerszberg et al. |
| 2006/0187114 | A1 | 8/2006 | Gibson et al. |
| 2006/0192672 | A1 | 8/2006 | Gidge et al. |
| 2006/0255930 | A1 | 11/2006 | Berkman |
| 2007/0001821 | A1 | 1/2007 | Berkman |
| 2007/0022449 | A1 | 1/2007 | Boyden et al. |
| 2007/0058907 | A1 | 3/2007 | Mynott et al. |
| 2007/0115973 | A1 | 5/2007 | Koga et al. |
| 2007/0127460 | A1 | 6/2007 | Wilber et al. |
| 2007/0146128 | A1 | 6/2007 | Pumpelly et al. |
| 2007/0250920 | A1 * | 10/2007 | Lindsay ................. G07F 7/1025 726/7 |

(56) References Cited

U.S. PATENT DOCUMENTS

| | | |
|---|---|---|
| 2008/0037461 A1 | 2/2008 | Biltz et al. |
| 2008/0049781 A1 | 2/2008 | Bugenhagen |
| 2008/0143491 A1 | 6/2008 | Deaver |
| 2008/0195259 A1 | 8/2008 | Davis et al. |
| 2008/0217996 A1 | 9/2008 | Niss |
| 2008/0219671 A1 | 9/2008 | Schmitt |
| 2008/0224851 A1 | 9/2008 | Pumpelly et al. |
| 2008/0225894 A1 | 9/2008 | Powell |
| 2008/0240029 A1 | 10/2008 | Lynch et al. |
| 2008/0259888 A1 | 10/2008 | Terashima |
| 2008/0291850 A1 | 11/2008 | Jensen |
| 2008/0292320 A1 | 11/2008 | Pederson |
| 2008/0296095 A1 | 12/2008 | Frank |
| 2008/0300750 A1 | 12/2008 | Davis et al. |
| 2009/0112569 A1 | 4/2009 | Angus et al. |
| 2009/0134699 A1 | 5/2009 | Choi et al. |
| 2009/0140849 A1 | 6/2009 | Henry |
| 2009/0259588 A1* | 10/2009 | Lindsay ............... G06Q 20/102 705/40 |
| 2010/0027515 A1 | 2/2010 | Hylton |
| 2010/0039242 A1 | 2/2010 | Refaeli et al. |
| 2010/0109862 A1 | 5/2010 | Sharma |
| 2010/0161483 A1 | 6/2010 | Littrell |
| 2010/0319956 A1 | 12/2010 | Ballard et al. |
| 2010/0329247 A1 | 12/2010 | Kennedy et al. |
| 2011/0007444 A1 | 1/2011 | Chang |
| 2011/0032149 A1 | 2/2011 | Leabman |
| 2011/0035553 A1 | 2/2011 | Shepstone et al. |
| 2011/0099371 A1 | 4/2011 | Roy et al. |
| 2011/0102585 A1 | 5/2011 | Kao |
| 2011/0142110 A1 | 6/2011 | Schwager |
| 2011/0190967 A1 | 8/2011 | Burk |
| 2011/0195656 A1 | 8/2011 | Owyang et al. |
| 2012/0027062 A1 | 2/2012 | Garcia |
| 2012/0028642 A1 | 2/2012 | Schliwa-Bertling |
| 2012/0068784 A1 | 3/2012 | Varadarajan et al. |
| 2012/0099627 A1 | 4/2012 | Mitchell et al. |
| 2012/0177198 A1* | 7/2012 | Cabos ................. H04L 63/0428 380/270 |
| 2012/0191830 A1 | 7/2012 | Scheid et al. |
| 2012/0268245 A1 | 10/2012 | Alexander et al. |
| 2013/0003756 A1 | 1/2013 | Mitchell et al. |
| 2013/0055321 A1 | 2/2013 | Cline et al. |
| 2013/0121042 A1 | 5/2013 | Gan et al. |
| 2013/0201316 A1 | 8/2013 | Binder et al. |
| 2013/0202018 A1 | 8/2013 | Li et al. |
| 2013/0244588 A1 | 9/2013 | Pereira |
| 2014/0049099 A1 | 2/2014 | Sampigethaya et al. |
| 2014/0074321 A1 | 3/2014 | Lee et al. |
| 2014/0075506 A1 | 3/2014 | Davis et al. |
| 2014/0112399 A1 | 4/2014 | Reuven |
| 2014/0236394 A1 | 8/2014 | Kumar et al. |
| 2014/0254693 A1 | 9/2014 | Mitchell et al. |
| 2014/0312682 A1 | 10/2014 | Lee et al. |
| 2014/0313629 A1 | 10/2014 | Lee |
| 2014/0341309 A1 | 11/2014 | Nguyen et al. |
| 2015/0016271 A1 | 1/2015 | Lee |
| 2015/0180538 A1 | 6/2015 | Smith et al. |
| 2016/0148449 A1* | 5/2016 | God ..................... G07C 9/257 340/5.6 |
| 2017/0048790 A1 | 2/2017 | Pratapa et al. |
| 2017/0161973 A1* | 6/2017 | Katta ................... G06Q 40/08 |
| 2017/0193026 A1* | 7/2017 | Pettovello ............ G06F 21/6254 |
| 2017/0193793 A1 | 7/2017 | Ricciuti |
| 2018/0217942 A1* | 8/2018 | Fons .................... H04L 9/16 |
| 2018/0247483 A1* | 8/2018 | Lindsay ............... G06Q 20/102 |
| 2018/0342032 A1 | 11/2018 | Daigle et al. |
| 2018/0367222 A1 | 12/2018 | Lee et al. |
| 2019/0058728 A1* | 2/2019 | Datta ................... H04L 63/20 |
| 2019/0172168 A1* | 6/2019 | Singh ................. G06Q 20/4014 |
| 2020/0076796 A1* | 3/2020 | Sherif ................. H04L 63/0428 |
| 2020/0267143 A1* | 8/2020 | Sherif ................. H04W 12/06 |
| 2020/0329051 A1* | 10/2020 | Grim ................... H04W 12/06 |

FOREIGN PATENT DOCUMENTS

| | | |
|---|---|---|
| CN | 1839558 A | 9/2006 |
| CN | 201376671 Y | 1/2010 |
| CN | 102014344 A | 4/2011 |
| CN | 105656515 A | 6/2016 |
| DE | 202011105000 U1 | 2/2012 |
| EP | 203249 A2 | 12/1986 |
| EP | 463341 A1 | 1/1992 |
| EP | 890907 A1 | 1/1999 |
| EP | 913954 A2 | 5/1999 |
| EP | 1134909 A1 | 9/2001 |
| EP | 1322047 A1 | 6/2003 |
| EP | 1363294 A2 | 11/2003 |
| EP | 1956726 A1 | 8/2008 |
| EP | 1992524 A1 | 11/2008 |
| EP | 2082962 A2 | 7/2009 |
| EP | 2111691 B1 | 10/2009 |
| EP | 2315367 A1 | 4/2011 |
| EP | 2445119 A1 | 4/2012 |
| EP | 2775629 A1 | 9/2014 |
| EP | 2899943 A1 | 7/2015 |
| GB | 2405513 A | 3/2005 |
| JP | 3069808 B2 | 11/1991 |
| JP | 7058675 B2 | 6/1994 |
| JP | 2000288375 A | 10/2000 |
| JP | 3133620 B2 | 2/2001 |
| JP | 2004336770 A | 11/2004 |
| JP | 2008098812 A | 4/2008 |
| JP | 2008193305 A | 8/2008 |
| JP | 2008295201 A | 12/2008 |
| JP | 2013019512 A | 1/2013 |
| WO | 1996007245 A1 | 3/1996 |
| WO | 1996023368 A1 | 8/1996 |
| WO | 2005067142 A1 | 7/2005 |
| WO | 2008097983 A1 | 8/2008 |
| WO | 2011080815 A1 | 7/2011 |
| WO | 2014028135 A1 | 2/2014 |
| WO | 2014039197 A1 | 3/2014 |

OTHER PUBLICATIONS

Search Query Report from IP.com (performed Oct. 22, 2021) (Year: 2021).*

Second Search Query Report from IP.com (performed Oct. 22, 2021) (Year: 2021).*

Third Search Query Report from IP.com (performed Oct. 22, 2201) (Year: 2021).*

Search Query Report from IP.com (performed Feb. 9, 2022) (Year: 2022).*

Alex Romanelli, "TI Gets Jump on Power over Ethernet", Electronic News Today, Apr. 28, 2003, Reed Business Information, New York, NY, USA.

Sampigethaya, Krishna et al., "Enhancing the Last Mile Communications at Airports", 28th International Congress of Aeronautical Sciences, Sep. 2012, 10 pgs.

The Wall Street Journal, Press Release Sep. 10, 2013, 2:13 p.m. ET, Apple Announces iPhone 5s—The Most Forward-Thinking Smartphone in the World, by Apple Inc., Retrieved from https://web.archive.org/web/20130913010513/http://online.wsj.com:80/article/PR-CO-20130910-909214.html.

* cited by examiner

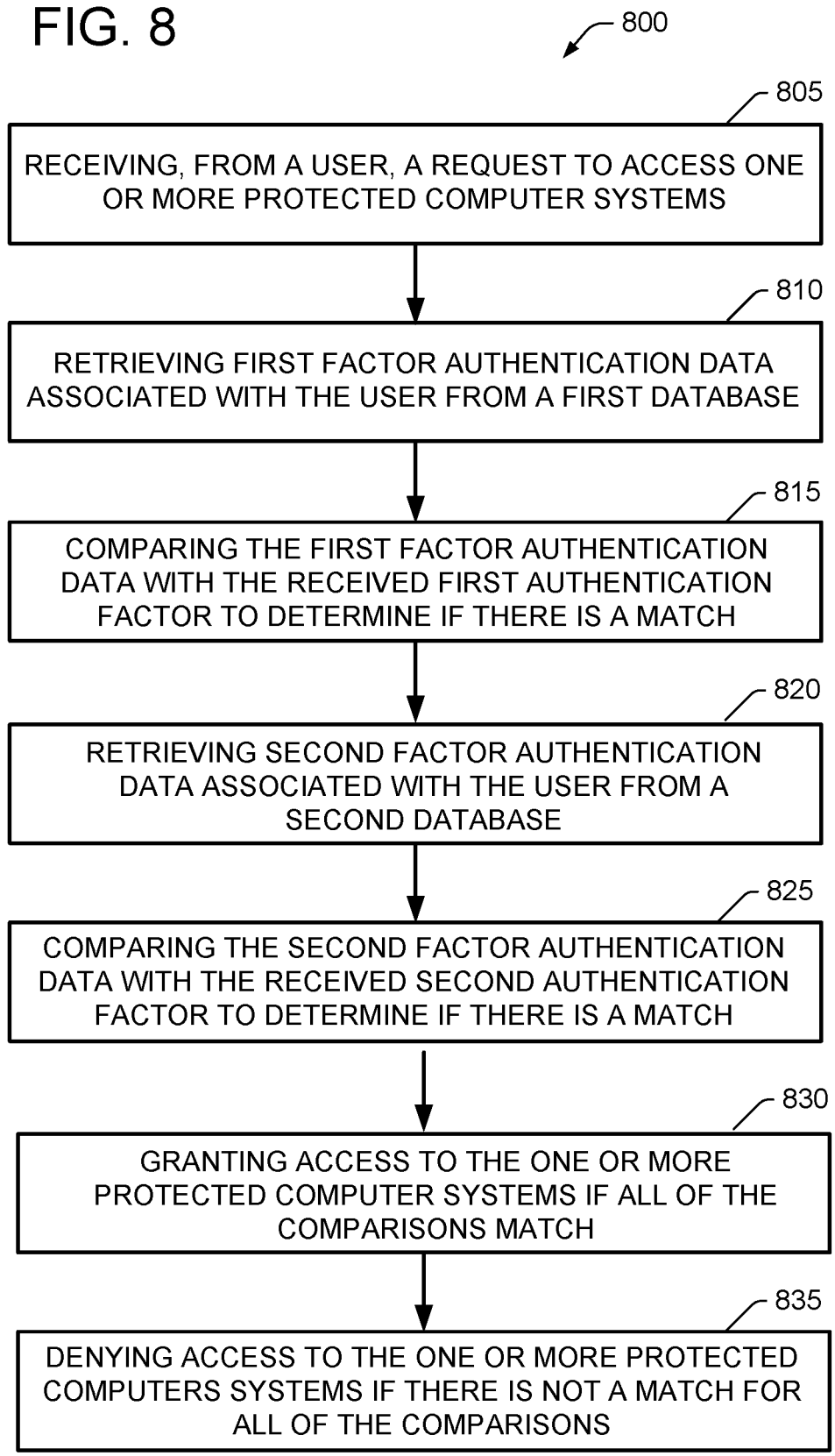

METHOD AND APPARATUS FOR ADVANCED SECURITY SYSTEMS OVER A POWER LINE CONNECTION

BACKGROUND

The field of the disclosure relates generally to methods and systems for secure data communication and more particularly, to methods and systems for increasing data security for communications across a three-phase power system.

Vehicles such as commercial aircraft, military aircraft, unmanned aircraft, and the various systems thereon, generate and consume considerable amounts of data. For example, engines are monitored at every stage of operation, which results in generation of significant amounts of data. Such engine monitoring data includes, for example, but not limited to compression ratios, rotation rate (RPM), temperature, and vibration data. In addition, fuel related data, maintenance, Airplane Health Monitoring (AHM), operational information, catering data, In-flight Entertainment Equipment (IFE) updates and passenger data like duty free shopping are routinely and typically generated onboard the aircraft.

At least some of these systems wirelessly connect to a ground system through a central airplane server and central transceiver for data transmission and reception. However, for certain critical systems and critical data are not configured for wireless transfer of data. Therefore, when an aircraft arrives at a gate, much of the data is downloaded manually from the aircraft. Specifically, data recording devices are manually coupled to interfaces on the aircraft and the data is collected from the various data generators or log books for forwarding and processing at a back office. In addition, the back office function transmits updated datasets, for example data related to a next flight(s) of the aircraft, to the aircraft.

Demand for additional communication channels and data transfer is driving rapid change in connection with such communications. Such increased demand is due, for example, to increasing reliance by ground systems upon data from the aircraft, as well as increased communication needs of the flight crew, cabin crew, and passengers. Furthermore, it is crucial that only authorized personnel are permitted to access aircraft networks and internal data to prevent the potential for serious threats or attacks on aircraft systems. These may include, but are not limited to, inappropriate access of aircraft networks, aircraft controls, aircraft data, the stealing or corruption of that data, and/or any other form of inappropriate or malevolent behavior associated with threats to the aircraft, its networks, its systems, controls, or data.

BRIEF DESCRIPTION

In one aspect, a multifactor authentication system onboard a vehicle is provided. The system includes at least one onboard processor, a first onboard database storing a first plurality of authentication data associated with a first factor for authentication, and a second onboard database storing a second plurality of authentication data associated with a second factor of authentication. The at least one onboard processor is in communication with the first onboard database, the second onboard database, and one or more onboard protected computer systems. The at least one processor is programmed to receive, from a user, a request for access to the one or more protected computer systems. The request contains authentication data including a first authentication factor and a second authentication factor. The at least one processor is also programmed to retrieve first factor authentication data associated with the user from the first onboard database. The at least one processor is further programmed to compare the first factor authentication data with the received first authentication factor to determine if there is a match. In addition, the at least one processor is programmed to retrieve the second factor authentication data associated with the user from the second onboard database. Furthermore, the at least one processor is programmed to compare the second factor authentication data with the received second authentication factor to determine if there is a match. Moreover, the at least one processor is programmed to grant access to the one or more onboard protected computer systems if all of the comparisons match.

In another aspect, a multifactor authentication computer device onboard a vehicle is provided. The multifactor authentication computer device includes at least one processor in communication with a first onboard database, a second onboard database, and one or more onboard protected computer systems. The first onboard database stores a first plurality of authentication data associated with a first factor for authentication. The second onboard database stores a second plurality of authentication data associated with a second factor of authentication. The at least one onboard processor is programmed to receive, from a user, a request for access to the one or more protected computer systems. The request contains authentication data including a first authentication factor and a second authentication factor. The at least one processor is also programmed to retrieve first factor authentication data associated with the user from the first onboard database. The at least one processor is further programmed to compare the first factor authentication data with the received first authentication factor to determine if there is a match. In addition, the at least one processor is programmed to retrieve the second factor authentication data associated with the user from the second onboard database. Moreover, the at least one processor is programmed to compare the second factor authentication data with the received second authentication factor to determine if there is a match. Furthermore, the at least one processor is programmed to grant access to the one or more onboard protected computer systems if all of the comparisons match.

In still another aspect, a method for authenticating a user is provided. The method is performed by at least one processor onboard a vehicle that is in communication with at least one memory device. The method includes receiving, from a user, a request to access one or more protected computer systems. The request contains authentication data including a first authentication factor and a second authentication factor. The method also includes retrieving first factor authentication data associated with the user from a first onboard database storing a first plurality of authentication data associated with a first factor for authentication. The method further includes comparing the first factor authentication data with the received first authentication factor to determine if there is a match. In addition, the method includes retrieving second factor authentication data associated with the user from a second onboard database storing a second plurality of authentication data associated with a second factor of authentication. Moreover, the method includes comparing the second factor authentication data with the received second authentication factor to determine if there is a match. Furthermore, the method includes granting access to the one or more onboard protected computer systems if all of the comparisons match. In addition, the method also includes denying access to the one or more onboard protected computers systems if there is not a match for all of the comparisons.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 8 is a flow chart of a process for authenticating a user using the multifactor authentication system shown in FIGS. 4 and 5.

Figure 1:
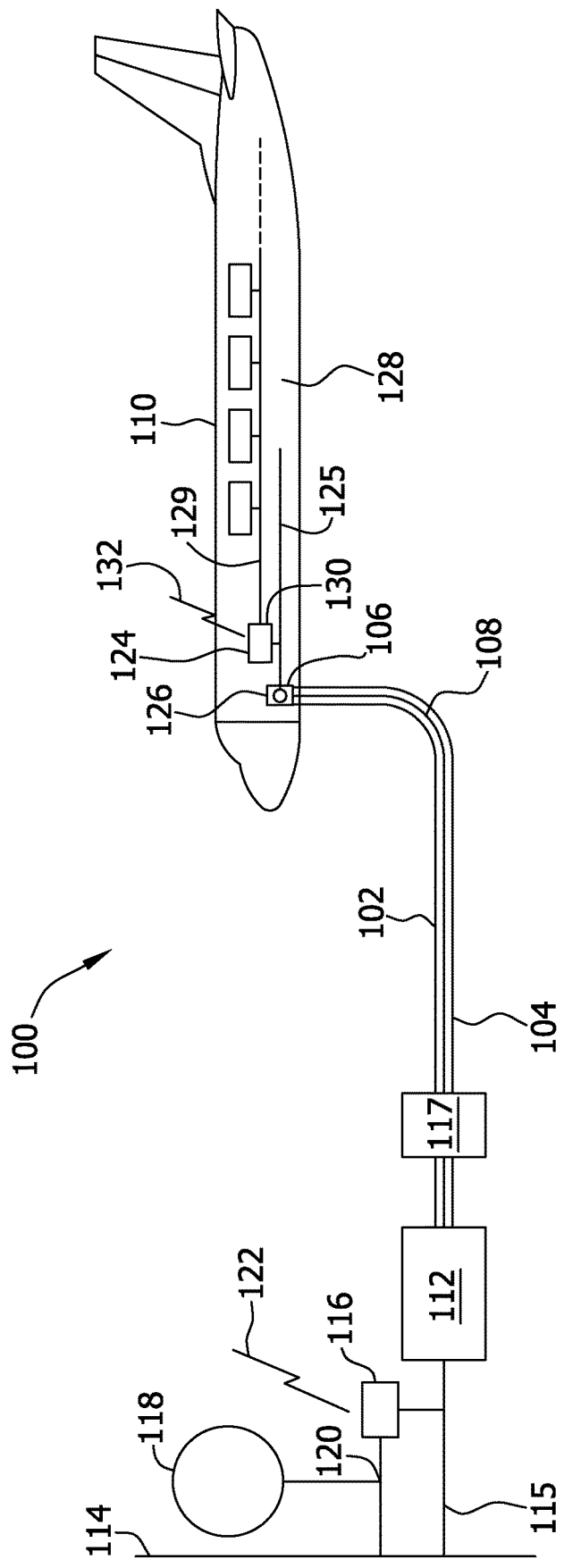
FIG. 1 illustrates a block diagram of a power and digital communication transmission system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The described embodiments enable secure vehicle broadband communication with a data network. More particularly, the present disclosure is directed to using multifactor authentication with broadband over powerline (BPL) communications to enable secure aircraft information exchange. The Communication over Powerline technology may be used to improve the data transmission and increase data security from the airplane to the airline's back office and vice versa.

Described herein are computer systems such as the BPL master and slave computer devices and related computer systems. As described herein, all such computer systems include a processor and a memory. However, any processor in a computer device referred to herein may also refer to one or more processors wherein the processor may be in one computing device or in a plurality of computing devices acting in parallel. Additionally, any memory in a computer device referred to herein may also refer to one or more memories wherein the memories may be in one computing device or in a plurality of computing devices acting in parallel.

Furthermore, while the terms "master" and "slave" are used herein to describe different computer devices, in some embodiments, this different devices may be considered more parallel devices rather than having the master device control the slave device. In some embodiments, the master device may be controlled by the slave device. For the purposes of this disclosure, the slave device is the device on the vehicle and the master device is the device on the ground or at the location that the vehicle is currently docked or stopped.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only and thus, are not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "multifactor authentication" refers to requiring at least two forms of identification before allowing a user access to at least one of a user account, a computer system, computer network, and/or data stored in a memory device, for example. Three types of identification used in multifactor authentication include, but are not limited to, something the user knows (such as a password), something the user has (such as a smartcard or other physical token), and something the user is (such as a fingerprint or other biometric identifier).

The systems and processes are not limited to the specific embodiments described herein. In addition, components of each system and each process can be practiced independent and separate from other components and processes described herein. Each component and process also can be used in combination with other assembly packages and processes.

FIG. 1 is a block diagram of a power and digital communication transmission system 100 in accordance with an exemplary embodiment of the disclosure. In the exemplary embodiment, power and digital communication transmission system 100 includes an electrical aircraft umbilical 102 comprising a supply end 104, a plug end 106, and an electrical conductor 108 extending there between. Plug end 106 is configured to mate with a vehicle such as an aircraft 110 such that electrical power is supplied to aircraft 110 through electrical conductor 108 from supply end 104. The electrical energy used to power commercial airplanes on the ground is 115 Vac, 400 Hz, three-phase power, and includes a neutral line. In the exemplary embodiment, supply end 104 couples to a ground power system 112 at an airport terminal gate 114. Ground power system 112 is configured to receive electrical power from a power supply through a power supply conduit 115. In other embodiments, ground power system 112 is located on a pier to couple to a boat, barge, or ship (not shown). In still other embodiments, ground power system 112 is positioned at a garage or service facility and is configured to couple to a wheeled vehicle, for example, but not limited to a car, a recreational vehicle (RV), or a train. Additionally, ground power system 112 may comprise another vehicle, such as a space vehicle, undersea or sea surface vehicle wherein one or both vehicles are moving with respect to each other and/or their surroundings while coupled through umbilical 102.

Power and digital communication transmission system 100 also includes a first interface device 116 electrically coupled to supply end 104. In the exemplary embodiment, interface device 116 is electrically coupled to supply end 104 through power supply conduit 115 and ground power system 112, where interface device 116 is electrically coupled to the power supply conduit 115 through which ground power system 112 receives electrical power. In an alternative embodiment, interface device 116 is electrically coupled to supply end 104 downstream of ground power system 112. In one embodiment, ground power system 112 is a distributed power system operating at voltages that are incompatible with aircraft 110. In such embodiments, a point of use power system 117 is utilized to step the voltage to a level that is compatible with aircraft 110. In another alternative embodiment, interface device 116 is electrically coupled to electrical conductor 108 internal to ground power system 112. Interface device 116 is also coupled to a network 118 through a wired network access point 120 or a wireless communication link 122.

Power and digital communication transmission system 100 also includes a second interface device 124 electrically coupled to plug end 106 when umbilical 102 is coupled to aircraft 110. In the exemplary embodiment, interface device 124 is electrically coupled to an onboard power bus 125 through plug end 106 through an umbilical plug 126 that traverses through a wall of a fuselage 128 of aircraft 110. Interface device 124 is also coupled to an onboard network 129 through an onboard wired network access point 130 or an onboard wireless communication link 132. In some situations, onboard wireless link 132 may be unable to transmit from the vehicle to outside of the vehicle due to attenuation from the vehicle itself. Examples of onboard wireless link 132 may include, but are not limited to, 60 GHz or low data rate wireless such as IoT applications over BLE, Zigbee, Wi-Fi, and Bluetooth.

First interface device 116 is configured to transmit and receive data carrier signals though electrical conductor 108 while power is supplied to aircraft 110 through electrical conductor 108. First interface device 116 is also configured to convert the data carrier signals from and to a predetermined data format on the network. Second interface device 124 is electrically coupled to plug end 106 when umbilical 102 is coupled to aircraft 110. Second interface device 124 (e.g., a receiver and a transmitter, onboard transceiver) is configured to transmit and receive the data carrier signals via umbilical 102 between first interface device 116 and onboard network 129 while power is supplied to aircraft 110 through electrical conductor 108. In the exemplary embodiment, each of first interface device 116 and second interface device 124 are configured to detect a communication link established through the electrical conductor and report the link to system 100. Interface devices 116 and 124 are electrically matched with the characteristics of umbilical 102 including but not limited to wire size, shielding, length, voltage, load, frequency, and grounding.

In the exemplary embodiment, the predetermined data format is compatible with various network protocols including but not limited to, Internet network protocol, gatelink network protocol, Aeronautical Telecommunications Network (ATN) protocol, and Aircraft Communication Addressing and Reporting System (ACARS) network protocol.

In the exemplary embodiment, high-speed network service to aircraft 110 while parked in a service location such as an airport terminal gate is provided through a conductor of the aircraft ground power umbilical using for example, but not limited to Broadband over Power Line (BPL), X10, or similar technology. Use of this technology permits the airports and airlines to add a simple interface to the aircraft umbilical at the gate and for aircraft manufacturers to provide a matching interface within the aircraft to permit broadband Internet service to the aircraft through an aircraft power link in the umbilical.

Broadband over Power Line (BPL) is a technology that allows Internet data to be transmitted over power lines. (BPL is also sometimes called Power-line Communications or PLC.) Modulated radio frequency signals that include digital signals from the Internet are injected/added/modulated onto the power line using, for example, inductive or capacitive coupling. These radio frequency signals are injected into or superimposed onto the alternating current power waveform that is transmitted via the electrical power conductor at one or more specific points. The radio frequency signals travel along the electrical power conductor to a point of use. Little, if any, modification is necessary to the umbilical to permit transmission of BPL. The frequency separation in the umbilical substantially minimizes crosstalk and/or interference between the BPL signals and other wireless services. BPL permits higher speed and more reliable Internet and data network services to the aircraft than wireless methods. Using BPL also eliminates the need to couple an additional separate cable to aircraft 110 because it combines aircraft electrical power and Internet/data services over the same wire. System 100 uses for example, an approximately 2.0 MHz to approximately 80.0 MHz frequency or X10 similar ranges with the exact frequency range use defined and engineered by the characteristics and shielding of umbilical 102 and the allowable RFI/EMI levels in that particular environment.

In an embodiment, symmetrical hi-broadband BPL is used in umbilical 102 to transmit data communication signals at communication speeds with aircraft 110 at rates in the tens or hundreds of megabits per second (Mbps). Because the BPL link is dedicated to only one aircraft 110 and not shared as wireless is, actual throughput can be from two to ten times the wireless throughput in the same environment. In addition, the throughput is stable and reliable in airport environments, whereas the existing wireless Gatelink services vary with the amount of RF interference and congestion at each airport.

Figure 2:
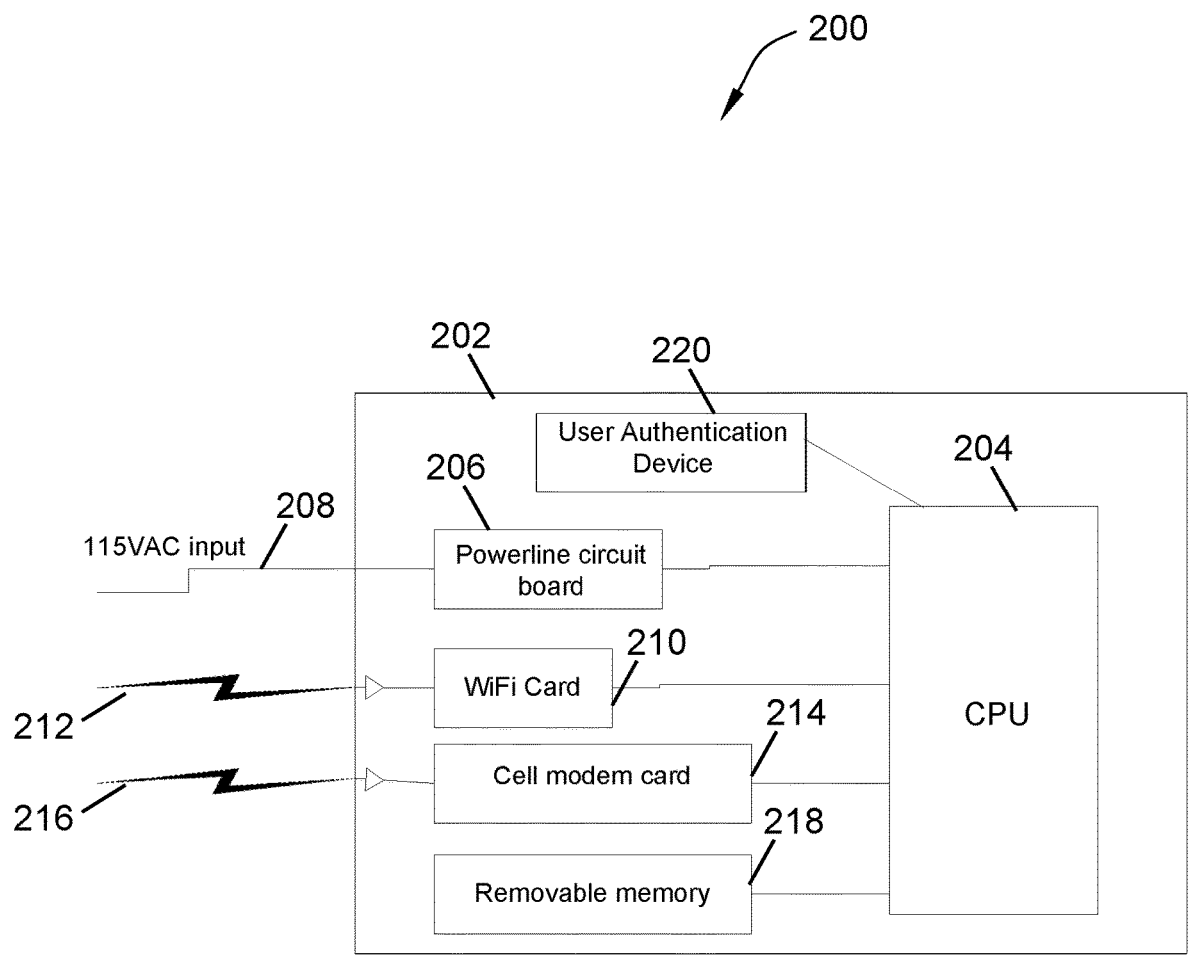
FIG. 2 illustrates a block diagram of a master control system in the power and digital communication transmission system shown in FIG. 1.

FIG. 2 illustrates a block diagram of a master control system 200 in the power and digital communication transmission system 100 shown in FIG. 1. In the exemplary embodiment, the master control system 200 includes a master control unit 202. In the exemplary embodiment, the master control unit 202 is coupled to the electrical power conduit 115 and functions as the first interface device 116 (shown in FIG. 1).

The master control unit 202 includes a central processing unit (CPU) 204 in communication with a powerline circuit board 206 (also known as a powerline transceiver). The powerline circuit board 206 allows the CPU 204 to communicate with other devices through a powerline and BPL connection 208. The BPL connection 208 uses powerlines similar to the electrical aircraft umbilical 102 (shown in FIG. 1).

The master control unit 202 also includes a Wi-Fi card 210 (also known as a Wi-Fi transceiver) for communicating with remotes devices via a first wireless connection 212. The master control unit 202 further includes a cell modem card 214 (also known as a cellular modem) for communicating with remoted devices via a second wireless connection 216. In some embodiments, master control unit 202 includes a removable memory 218. The removable memory 218 includes any memory card and device that may be removable attached to master control unit including, but not limited to, universal serial bus (USB) flash drives, external hard drives, and non-magnetic media. The CPU 204 is in communication with and in control of powerline circuit board 206, Wi-Fi card 210, cell modem card 214, and removable memory 218. While the above describes Wi-Fi and cellular connections cards 210 and 214 may also connect wirelessly through other methodologies, including, but not limited to, 60 Ghz, AeroMACS, WiMAX, Whitespace and Bluetooth.

In the exemplary embodiment, the CPU 204 detects that a connection has been made with another device over the BPL connection 208, such as to second interface device 124 (shown in FIG. 1). The CPU 204 receives a plurality of data via BPL connection 208 and the powerline transceiver 206. The CPU 204 determines a destination for the plurality of data. In some embodiments, the destination is another computer. In other embodiments, the destination is a plurality of computers or a computer network. In some embodiments, the destination is one or more computer systems associated with the airline, the airport, and/or an operations back office. The master control unit 202 is remote from the destination. In the exemplary embodiment, the master control unit 202 able to remotely connect to the destination via one or more wireless networks. In these embodiments, the CPU 204 determines whether to route the plurality of data through the first wireless transceiver (i.e., the Wi-Fi card 210) or the second wireless transceiver (i.e., the cell modem card 214). The first and second wireless transceivers may also connect using 60 Ghz, AeroMACS, WiMAX, Whitespace, and Bluetooth.

In the exemplary embodiment, the master control unit 202 also includes an user authentication system 220. The user authentication system 220 includes one or more devices that allows the system 100 to authenticate the user. The user authentication device 220 may include, but is not limited to, a keyboard or keypad, a card reader, a radio-frequency identifier (RFID) reader, a biometric scanner, and any other device that may be used to identify and authenticate the user. In the exemplary embodiment, the user authentication device 220 provides multifactor authentication, requiring the user to provide a biometric identifier and at least one of a password and a token identifier. In the exemplary embodiment, the authentication information is received by the CPU 204 of the master control unit 202 and transmitted over the electrical aircraft umbilical 102 (shown in FIG. 1) to an authentication system, such as the dynamic multifactor authentication system 410 (shown in FIG. 4), onboard the aircraft 110 (shown in FIG. 1).

In some embodiments, the CPU 204 tests the signal strength of the first wireless connection 212 and the second wireless connection 216. The CPU 204 compares the signal strength of the first wireless connection 212 and the second wireless connection 216 to determine which connection to use to transmit the plurality of data to the destination. Then the CPU 204 routes the plurality of data to the destination using the determined wireless connection. In some further embodiments, master control unit 202 also considers the reliability of the first and second wireless connections 212 and 216 in determining which wireless connection to use In some embodiments, if the signal strength of the first wireless connection 212 and the second wireless connection 216 are both below corresponding predetermined thresholds, then the CPU 204 stores the plurality of data on the removable memory 218. In some further embodiments, the CPU 204 transmits the plurality of data to the destination at a subsequent time when the signal strength of one of the first wireless connection 212 and the second wireless connection 216 exceeds the respective predetermined threshold.

In some further embodiments, the CPU 204 audits the voltage, current, and phase of the BPL connection 208 to determine if the connection is within parameters. The CPU 204 may determine whether or not to transmit the plurality of data based on the audit. Furthermore, the CPU 204 may determine whether or not to receive the data over the BPL connection 208 if the CPU 204 determines that the connection is not within parameters. This ensures that the BPL connection 208 is properly connected prior to transmitting a plurality of data to ensure both the security of the connection and the integrity of the data being received by the master control unit 202.

In some further embodiments, the master control unit 202 transmits data over the BPL connection 208 to the slave unit about future aircraft operations, such as, but not limited to, software updates for one or more systems, additional movies and/or other entertainment options, flight paths, and weather information. In these embodiments, the master control unit 202 may have received the data for uploading to the slave unit from the airport, the airline, or an operations back office.

In some additional embodiments, master control unit 202 is stored on aircraft 110. When aircraft 110 lands at an airport that does not have an existing BPL system, master control unit 202 is deployed to connect to one or more wireless networks at the airport. In some further embodiments, the master control unit 202 is secured with a password to ensured access by authorized users.

Figure 3:
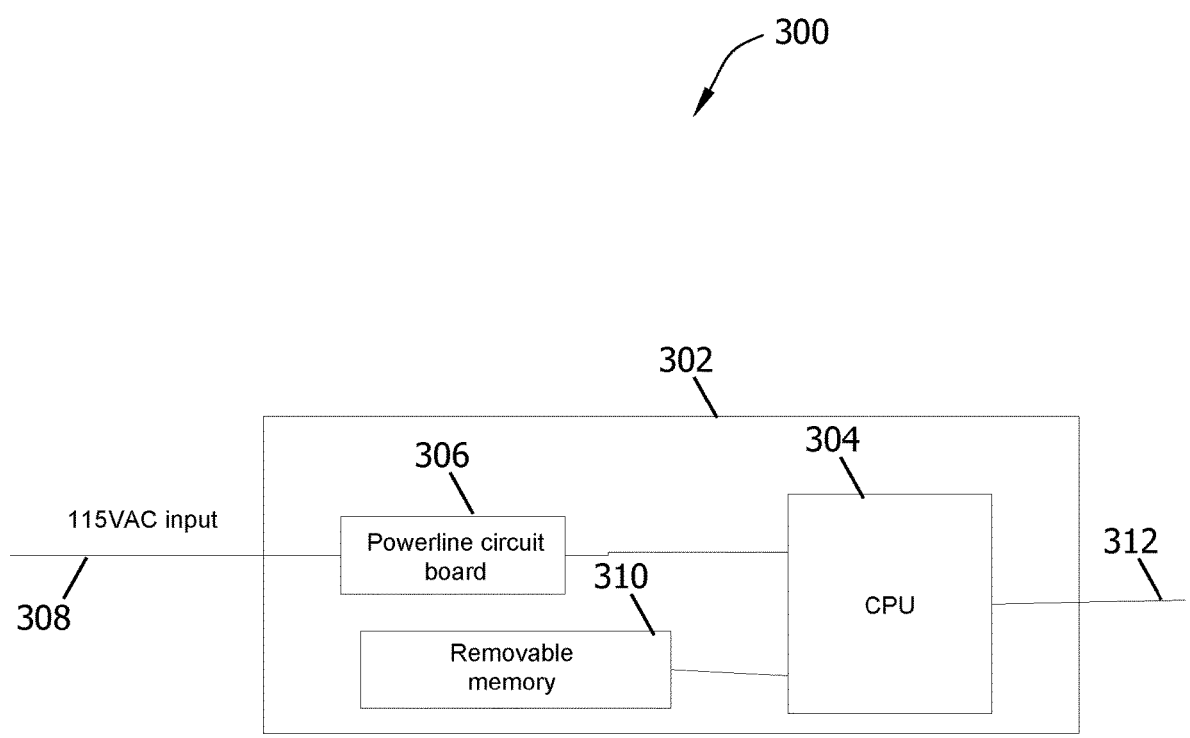
FIG. 3 illustrates a block diagram of a slave system in the power and digital communication transmission system shown in FIG. 1.

FIG. 3 illustrates a block diagram of a slave system 300 in the power and digital communication transmission system 100 shown in FIG. 1. In the exemplary embodiment, the slave system 300 includes a slave unit 302 that may be onboard a vehicle. In the exemplary embodiment, the slave unit 302 is similar to the second interface device 124 (shown in FIG. 1).

The slave unit 302 includes a processor or central processing unit (CPU) 304 in communication with a powerline circuit board 306 (also known as a powerline transceiver). The powerline circuit board 306 allows the CPU 304 to communicate with other devices through a BPL connection 308. The BPL connection 308 uses powerlines similar to the electrical aircraft umbilical 102 (shown in FIG. 1).

In some embodiments, the slave unit 302 includes a removable memory 310. Removable memory 310 includes any memory card and device that may be removable attached to master control unit including, but not limited to universal serial bus (USB) flash drives, external hard drives, and non-magnetic media. The processor or CPU 304 is in communication with and in control of powerline circuit board 306 and removable memory 310. In some embodiments, slave unit 302 is onboard an aircraft 110 and has a connection 312 to a plurality of systems aboard the aircraft. In these embodiments, slave unit 302 receives data from the plurality of systems about the operation of the aircraft.

In the exemplary embodiment, the onboard slave unit 302 including a processor or CPU 304 has a connection 312 that connects to the aircraft network 412 through the dynamic multifactor authentication system 410 (both shown in FIG. 4), where the dynamic multifactor authentication system 410. In the exemplary embodiment, the dynamic multifactor authentication system 410 authenticates the user before providing access to the aircraft network 412.

In the exemplary embodiment, the CPU 304 receives a plurality of data from the plurality of systems over connection 312. The CPU 304 determines whether a connection has been made with another device over the BPL connection 308, such as to master control unit 202 (shown in FIG. 2). If a connection has been made, the CPU 304 transmits, via the powerline transceiver 306, the plurality of data to the BPL master control unit 202. If there is no connection, the CPU 304 stores the plurality of data in the removable memory 310.

In an exemplary embodiment, the processor or CPU 304 of slave unit 302 onboard the aircraft determines if the aircraft 110 is on the ground prior to determining whether or not the powerline transceiver 306 is connected to the master control unit 202. In some embodiments, the CPU 304 continuously receives data from the plurality of systems. The CPU 304 stores that data in the removable memory 310. When the CPU 304 determines that the aircraft is on the ground and connected to a master control unit 202, the CPU 304 transfers the data from the removable memory 310 to the master control unit 202 via the BPL connection 308.

In some further embodiments, the CPU 304 audits the voltage, current, and phase of the BPL connection 308 to determine if the connection is within parameters. The CPU 304 may determine whether or not to transmit the plurality of data based on the audit. Furthermore, the CPU 304 may determine whether or not to receive the data over the BPL connection 308 if the CPU 304 determines that the connection is not within parameters. This ensures that the BPL connection 308 is properly made prior to transmitting a plurality of data to ensure both the security of the connection and the integrity of the data being transmitted to and received from the master control unit 202.

In some further embodiments, the master control unit 202 transmits data over the BPL connection 308 to the slave unit 302 about future aircraft operations, such as, but not limited to, software updates for one or more systems, additional movies and/or other entertainment options, flight paths, and weather information. In some embodiments, the slave unit 302 routes the data to the appropriate systems on the vehicle. In other embodiments, the slave unit 302 acts as a pass-through to the vehicle's network.

In some further embodiments, the slave unit 302 is secured with a password to ensured access by authorized users.

Figure 4:
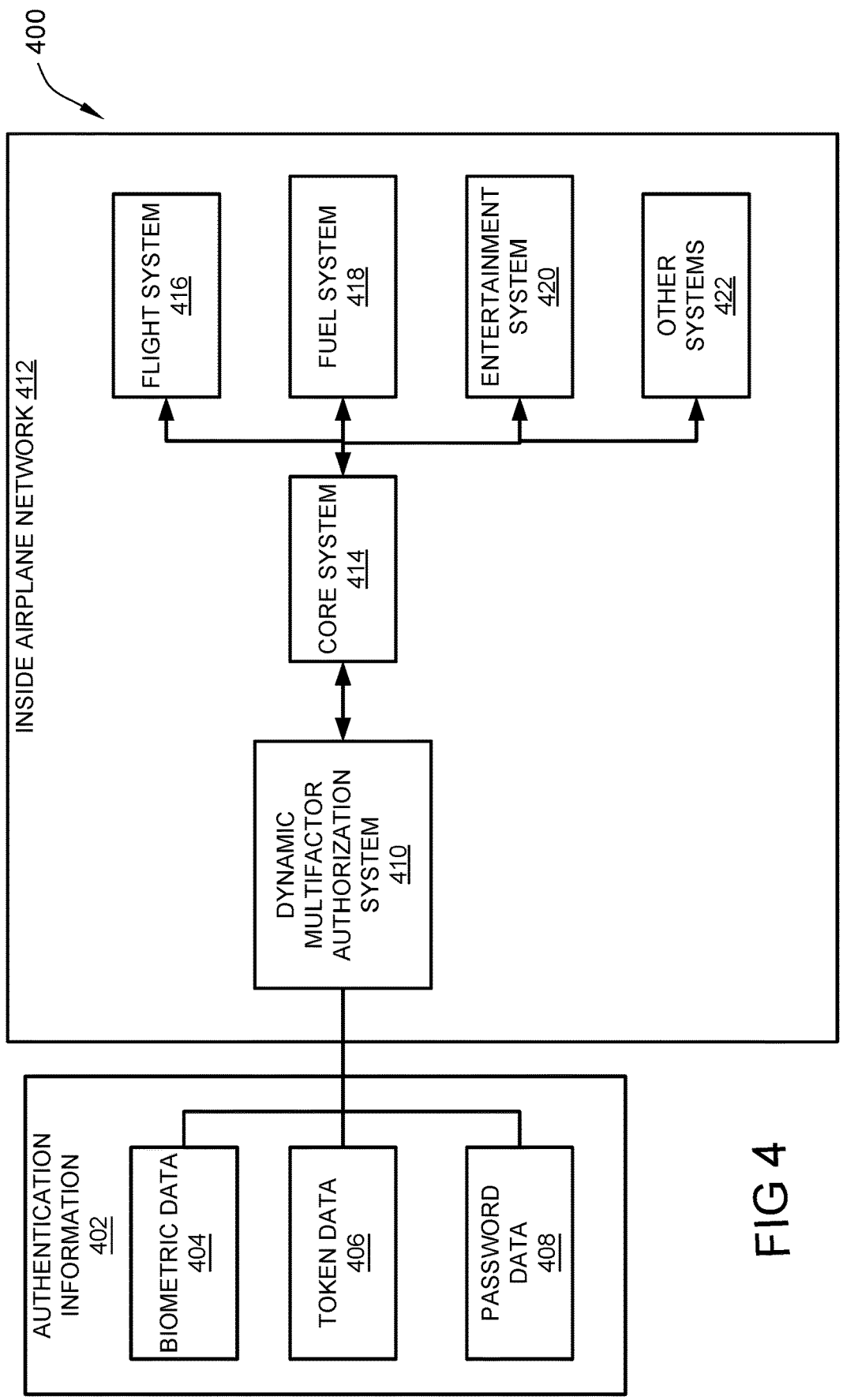
FIG. 4 illustrates a simplified flow diagram of a multi-factor authentication system using the power and digital communication transmission system shown in FIG. 1.

FIG. 4 illustrates a simplified flow diagram of a multi-factor authentication system 400 using the power and digital communication transmission system 100 shown in FIG. 1 and the slave unit 302 shown in FIG. 3, where the multi-factor authentication system 400 is implemented by the processor or CPU 304 of the slave unit 302 onboard the aircraft. In the exemplary embodiment, when a user desires to access an aircraft network 412, the multifactor authentication system 400 performs an authentication check on the user to confirm the identity of the user. In the exemplary embodiment, the aircraft network 412 includes a core system 414 for the operation of the aircraft 110 (shown in FIG. 1). In addition to the core system 414, the aircraft network 412 may include, but is not limited to, flight systems 416, fuel systems 418, entertainment systems 420 and other systems 422 necessary to operate the aircraft 110. In some embodiments, aircraft network 412 is similar to onboard network 129 (shown in FIG. 1).

In the exemplary embodiment, the aircraft network 412 is protected by a dynamic multifactor authentication system 410. The dynamic multifactor authentication system 410 functions as a gateway to control access to the systems contained in the aircraft network 412. When a computer device, such as master control unit 202 (shown in FIG. 2) attempts to access the aircraft network 412, the dynamic multifactor authentication system 410 requests authentication information 402 from the requestor computer device, such as the master control unit 202. In other embodiments, the requestor computer device may include crew devices, passenger devices (such as smartphones and tablets), maintenance devices, and any other device attempting to access the aircraft network 412.

In the exemplary embodiment, authentication information 402 includes biometric data 404, token data 406, and password data 408. Biometric data 404 includes biometric information that may be used to identify the user. Biometric data 404 may include, but is not limited to, retinal scans, iris scans, fingerprint data, facial recognition data, facial recognition, ear recognition, silhouette recognition, speaker recognition, device motion pattern recognition, and contact pattern recognition. Token data 406 represents data from a physical device possessed by the user, where the token includes data that is read and/or received by the multifactor authentication system 410. This data may be from disconnected fob that generates an access code, a device that connects to the request computer device (such as a USB token or an inserted access card), an RFID tag or other physical token that broadcasts a signal, or a software token stored on the requestor computer device. Password data 408 represents any password, pass phrase, personal identification number (PIN), challenge question, or any other piece of information that the user should know to be authenticated by the system 400. In the exemplary embodiment, the authentication data 402 also includes a user identifier, such as a user name, to uniquely identify the user and to allow the system to determine which entries are associated with that user.

In the exemplary embodiment, the dynamic multifactor authentication system 410 requires at least two-factor authentication. In this embodiment, this includes biometric data 404 and one of token data 406 and password data 408. In other embodiments, all three types of authentication information 402 may be required. In still further embodiments, multiple data of each type may be required. For example, two forms of biometric data 404 may be required. In some embodiments, the types of authentication data 402 provided are based on the capabilities of the requesting device and its included user authentication device 220 (shown in FIG. 2).

In some embodiments, the dynamic multifactor authentication system 410 may be operated in a sandbox. The dynamic multifactor authentication system 410 functions as a secure gate in front of important systems. In some embodiments, the dynamic multifactor authentication system 410 resides in core system 414. In other embodiments, the dynamic multifactor authentication system 410 is a standalone device or program.

Figure 5:
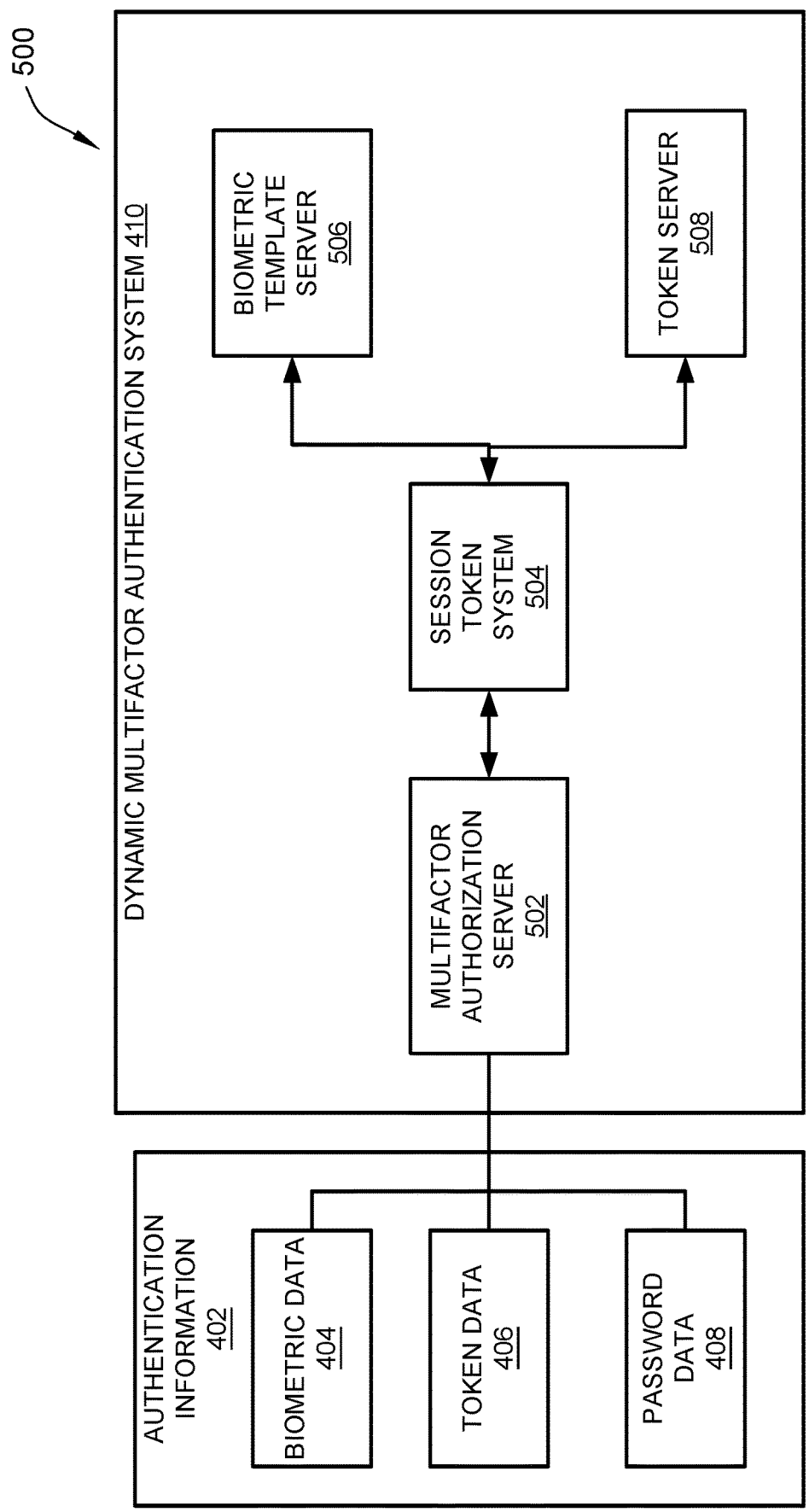
FIG. 5 illustrates a block diagram of the multifactor authentication system shown in FIG. 4.

FIG. 5 illustrates a block diagram of the multifactor authentication system 410 shown in FIG. 4, which may be onboard a vehicle or aircraft. In the exemplary embodiment, the multifactor authentication system 410 includes a multifactor authentication server 502, a session token server 504, a biometric template server 506 having a database for storing data associated with a factor of authentication comprising biometric data, and a token server 508 having a database for storing data associated with a factor of authentication comprising token data. In some embodiments, the servers 502, 504, 506, and 508 are separate physical devices that are onboard the vehicle or aircraft. In other embodiments, the servers 502, 504, 506, and 508 are virtual devices that may be executed on one or more computer devices associated with the aircraft network 412 (shown in FIG. 4).

In the exemplary embodiment, the biometric template server 506 stores a plurality of biometric templates from a plurality of users. For example, the biometric template server 506 may store fingerprint data for a plurality of registered users. In the exemplary embodiment, the biometric template server 506 stores the biometric templates as encrypted data. For example, the biometric template server 506 may store a hash code of the previously provided biometric data. While the example described herein uses a hash code to store the encrypted biometric data, one having ordinary skill in the art would understand that a multitude of encryption methods may be used with the systems described herein. In the exemplary embodiment, the stored biometric template data has been previously provided by the user and stored in the biometric template server 506, such as when the user registers or updates his or her profile.

In the exemplary embodiment, the token server 508 stores encrypted token data or password data. As described above, this data is provided when the user registers or updates his or her profile with the system that they desire to access. As described above with regards to the biometric templates, the token or password data is similarly encrypted.

In the exemplary embodiment, the biometric data in the biometric template server 506 and the token data in the token server 508 is encrypted to ensure the security of the system 400. For example, if an attacker was able to access the biometric data or token data contained in one of these servers 506 and 508, the encrypted nature of the data would make it more difficult for the attacker to use in attempt to access the aircraft network 412 or other protected system. If the data was not encrypted, then the attacker could simply send the stored authentication data 402 to the multifactor authentication system 410 to request access. However, since the data is encrypted, the multifactor authentication system 410 will not recognize the data as described below. Furthermore, the biometric data and token data is divided between the two separate servers 506 and 508, so that a compromise of one of the servers will not allow the attacker to obtain both the biometric data and token data to access the system, since each server 506 and 508 only stores half of the required biometric data and token data.

In the exemplary embodiment, when a user attempts to access the aircraft network 412, the user transmits the authentication data 402 to the multifactor authentication system 410. The authentication information 402 is routed to the multifactor authentication server 502. In some embodiments, the authentication data 402 is encrypted using a first encryption method prior to being transmitted to the multifactor authentication server 502. The first encryption method is different than that used for storing the data in the biometric template server 506 and the token server 508. The purpose of this encryption is to protect the data during transmission. For example, the encrypted authentication data 402 may be transmitted in the payloads of one or more data packets transmitted to the multifactor authentication system 400 over the electrical aircraft umbilical 102.

In the exemplary embodiment, the multifactor authentication system 410 receives the authentication data 402. The authentication data 402 is routed to the multifactor authentication server 502. If the authentication data 402 is encrypted, the multifactor authentication server 502 decrypts the data using the first encryption/decryption method that is different from that used for encrypting storing the data in the biometric template server 506 and the token server 508. The multifactor authentication server 502 transmits the authentication data 402 to the session token server 504. The session token server 504 parses the authentication data 402. The session token server 504 transmits the biometric data 404 to the biometric template server 506.

In the exemplary embodiment, the session token server 504 also transmits an identifier associated with the user, which may the identifier contained in the authentication data 402. In other embodiments, the identifier is one that the session token server 504 looked up based on the user identifier in the authentication data 402. In the exemplary embodiment, the encrypted data is stored with user identifiers that are different than those that the user uses to access the system. This requires a separate database of correlations linking the provided user identifiers to the stored identifiers. In addition, the biometric template and the token data are stored with different identifiers. In this example, the user provides a user identifier in the authentication data 402. The session token server 504 uses the provided user identifier to look up the user identifier for the biometric template and the user identifier for the token. The session token server 504 transmits the appropriate user identifier to the biometric template server 506 and token server 508, respectively.

In some embodiments, the session token server 504 encrypts the biometric data 404 prior to transmitting to the biometric template server 506. This encryption uses the same method as that used for the stored biometric templates. In these embodiments, the biometric template server 506 compares the received encrypted biometric data 404 to the stored biometric template and reports back whether or not there is a match. In other embodiments, the biometric template server 506 receives the unencrypted biometric data 404, encrypts the biometric data 404, and compares it to the corresponding stored biometric template. The biometric template server 506 then reports back whether or not there is a match.

In some embodiments, the session token server 504 encrypts the token data 406 or password data 408 prior to transmitting to the token server 508. This encryption uses the same method as that used for the stored token/password data. In these embodiments, the token server 508 compares the received encrypted data 406 or 408 to the stored token/password data and reports back to the session token server 504 whether or not there is a match. In other embodiments, the token server 508 receives the unencrypted token data 406 or password data 408, encrypts the token data 406 or password data 408, and compares it to the corresponding stored token/password data. The token server 508 then reports back to the session token server 504 whether or not there is a match.

In the exemplary embodiment, the session token server 504 retrieves the biometric template or token/password data from the biometric template server 506 and the token server 508, respectively. The session token server 504 compares the retrieved biometric template and token/password data to the received authentication data 402 to determine whether or not there is a match. In some embodiments, the session token server 504 encrypts the authentication data 502 prior to the comparison. In other embodiments, the session token server 504 decrypts the retrieved the biometric template or token/password data prior to the comparison.

In still other embodiments, the biometric template server 506 receives the received biometric data 404. The biometric template server 506 retrieves the corresponding biometric template and decrypts the retrieved template. Then the biometric template server 506 compares the received biometric data 404 to the decrypted biometric template to determine whether or not there is a match. The biometric template server 506 then reports back whether or not there is a match.

In still other embodiments, the token server 508 receives the received token/password data 406 and 408. The token server 508 retrieves the corresponding stored token/password data and decrypts the retrieved data. Then the token server 508 compares the received token/password data 406 and 408 to the decrypted token/password data to determine whether or not there is a match. The token server 508 then reports back whether or not there is a match.

In the exemplary embodiment, the session token server 504 reports back to the multifactor authentication server 502 whether or not the authentication succeeded, where the session token server 504 reports a pass or fail. In the exemplary embodiment, the session token server 504 reports back which authentication check failed. If the authentication check succeeded, then the multifactor authentication server 502 allows the requestor computer device to access the aircraft network 412. If the authentication check fail, then the multifactor authentication server 502 prevents access to the aircraft network 412. When the requestor computer device has failed the authentication check multiple times, the multifactor authentication server 502 will block the requestor computer device from trying again and filter that IP address from further attempts at accessing the aircraft network 412 in any way. In some further embodiments, the multifactor authentication server 502 may report the requestor computer device's IP address and any biometric information provided to the core system 414 (shown in FIG. 4), so that that information may be sent to one or more computer systems on the ground. This information may be sent via an offboard link between the aircraft and the ground computer systems. This may occur when the aircraft is on the ground or in the air.

In some embodiments, the multifactor authentication server 502 performs the actions of the session token server 504 and is in communication with the biometric template server 506 and the token server 508.

In some embodiments, each passenger has a biometric template stored in the biometric template server 506. This may occur when the passenger boards the aircraft. In addition, each seat may have been assigned its own IP address. Furthermore, each zone of the aircraft may have its own separate router. These three sets of data allow the dynamic multifactor authentication system 410 to determine whether or not the passenger is authenticated based on their attributes. For example, the dynamic multifactor authentication system 410 may analyze the IP address and zone that the authentication request is received from and confirm that the passenger whose biometric data 404 has been submitted matches that seat and zone.

In one example, multifactor authentication server 502 receives authentication data 402 including a username, biometric data 404, and token data 406. The multifactor authentication server 502 transmits the authentication data 402 to the session token server 504. The session token server 504 accesses a user identifier database and uses the username in the authentication data 402 to retrieve a different user identifier for the user. The session token server 504 transmits the retrieved user identifier and the biometric data 404 to the biometric template server 506. The biometric template server 506 uses the retrieved user identifier to retrieve a biometric template associated with the user. The biometric template server 506 compares the retrieved biometric template to the received biometric data 404 to determine if there is a match. The biometric template server 506 returns the results of the comparison. The session token server 504 transmits the retrieved user identifier and the token data 406 to the token server 508. The token server 508 uses the retrieved user identifier to retrieve token data associated with the user. The token server 508 compares the retrieved token data to the received token data 406 to determine if there is a match. The token server 508 returns the results of the comparison. The session token server 504 reports the results of both of the comparisons and the multifactor authentication server 502 authenticates the user if all of the comparisons match.

Figure 6:
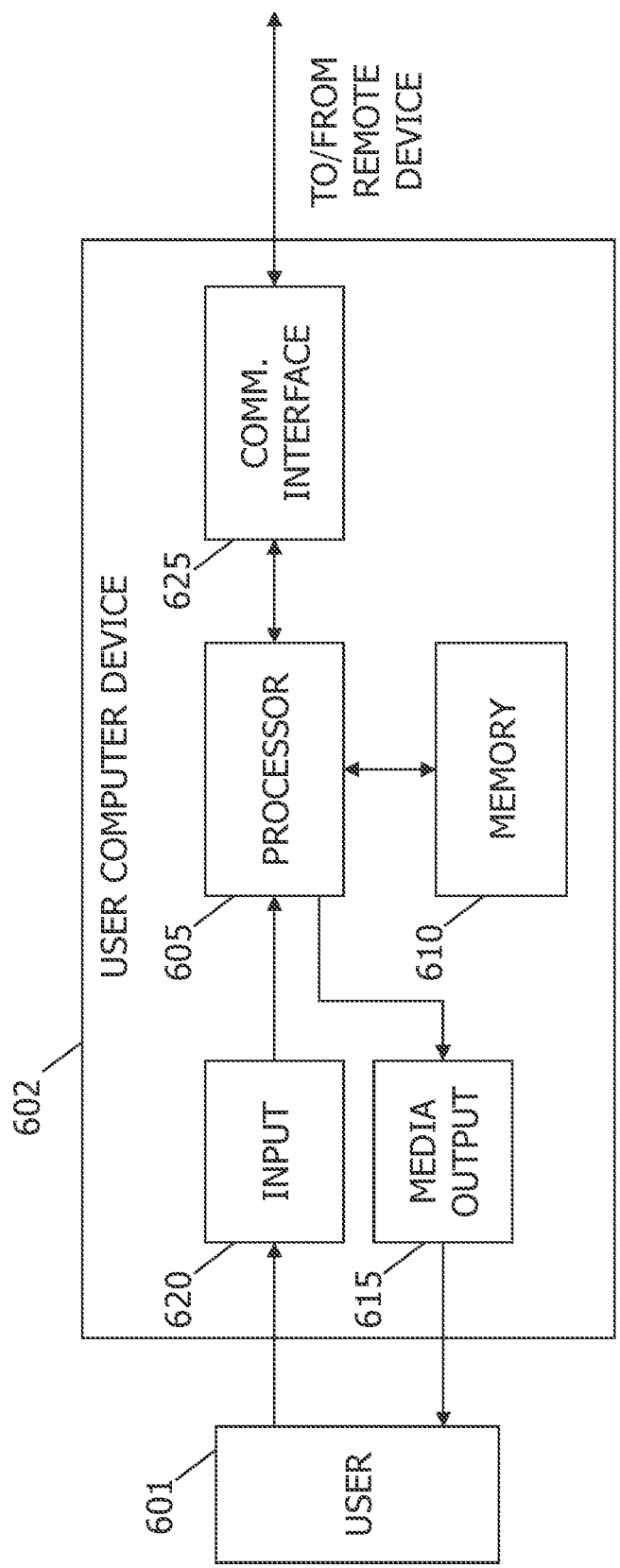
FIG. 6 illustrates an example configuration of a client system shown in FIG. 1, in accordance with one embodiment of the present disclosure.

FIG. 6 illustrates an example configuration of a client system shown in FIG. 1, in accordance with one embodiment of the present disclosure.

User computer device 602 is operated by a user 601. User computer device 602 may include first interface device 116, second interface device 124 (both shown in FIG. 1), master control unit 202 (shown in FIG. 2), and slave unit 302 (shown in FIG. 3). User computer device 602 includes a processor 605 for executing instructions. In some embodiments, executable instructions are stored in a memory area 610. Processor 605 may include one or more processing units (e.g., in a multi-core configuration). Memory area 610 is any device allowing information such as executable instructions and/or transaction data to be stored and retrieved. Memory area 610 may include one or more computer-readable media.

User computer device 602 also includes at least one media output component 615 for presenting information to user 601. Media output component 615 is any component capable of conveying information to user 601. In some embodiments, media output component 615 includes an output adapter (not shown) such as a video adapter and/or an audio adapter. An output adapter is operatively coupled to processor 605 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 615 is configured to present a graphical user interface (e.g., a web browser and/or a client application) to user 601. A graphical user interface may include, for example, one or more settings for connecting to another device via a power cable and/or receiving authentication information. In some embodiments, user computer device 602 includes an input device 620 for receiving input from user 601. User 601 may use input device 620 to, without limitation, select and/or enter a setting for a network. Input device 620 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 615 and input device 620. In some embodiments, input device 620 may also include the capability of receiving authentication information from the user 601. In these embodiments, input device 620 may include one or more of, a keyboard or keypad, a card reader, a radio-frequency identifier (RFID) reader, a biometric scanner, and any other device that may be used to identify and authenticate the user 601.

User computer device 602 may also include a communication interface 625, communicatively coupled to a remote device such as master control unit 202. Communication interface 625 may include, for example, a wired or wireless network adapter and/or a wireless data transceiver for use with a mobile telecommunications network.

Stored in memory area 610 are, for example, computer-readable instructions for providing a user interface to user 601 via media output component 615 and, optionally, receiving and processing input from input device 620. The user interface may include, among other possibilities, a web browser and/or a client application. Web browsers enable users, such as user 601, to display and interact with media and other information typically embedded on a web page or a website from master control unit 202. A client application allows user 601 to interact with, for example, master control unit 202. For example, instructions may be stored by a cloud service and the output of the execution of the instructions sent to the media output component 615.

Figure 7:
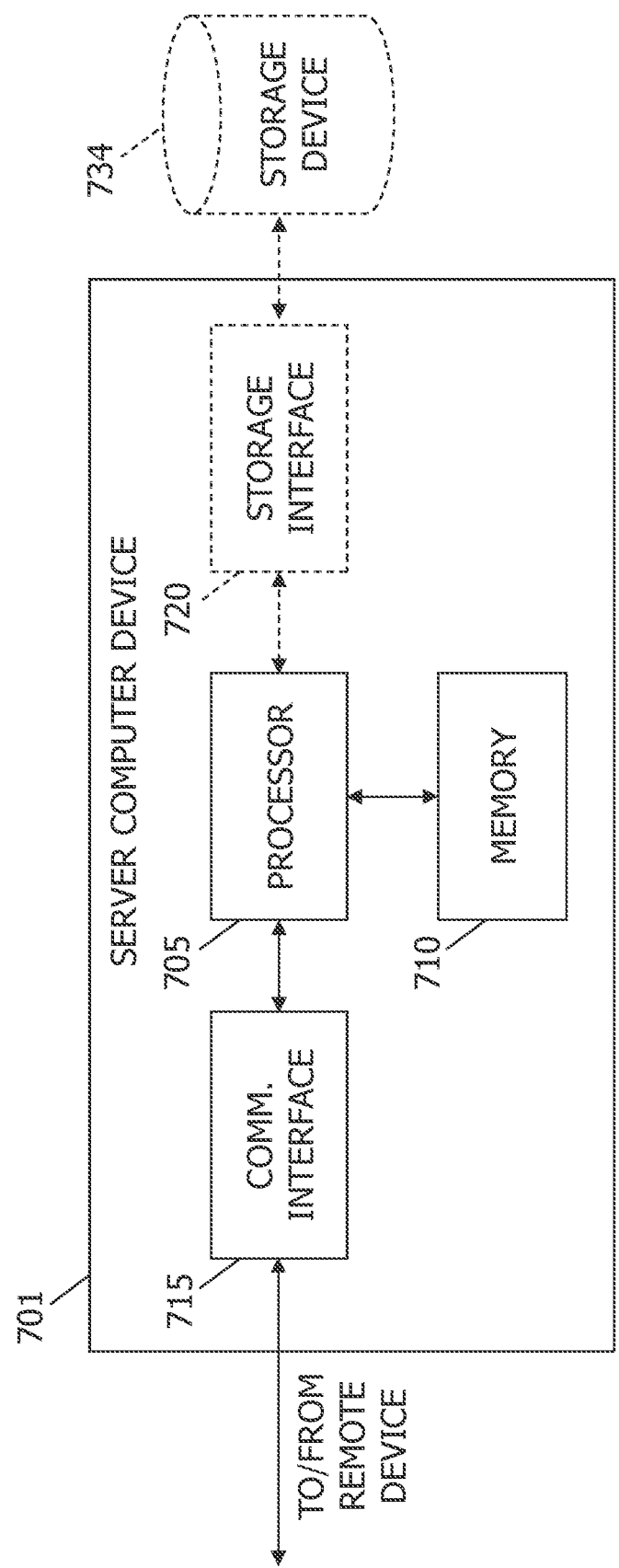
FIG. 7 illustrates an example configuration of a server system shown in FIGS. 1, 4, and 5, in accordance with one embodiment of the present disclosure.

FIG. 7 illustrates an example configuration of a server system shown in FIGS. 1, 4, and 5, in accordance with one embodiment of the present disclosure. Server computer device 701 may include, but is not limited to, first interface device 116, second interface device 124 (both shown in FIG. 1), master control unit 202 (shown in FIG. 2), slave unit 302 (shown in FIG. 3), dynamic multifactor authentication system 410, core system 414, flight system 416, fuel system 418, entertainment system 420, other systems 422 (shown in FIG. 4), multifactor authentication server 502, session token server 504, biometric template server 506, and token server 508 (shown in FIG. 5). Server computer device 701 also includes a processor 705 for executing instructions. Instructions may be stored in a memory area 710. Processor 705 may include one or more processing units (e.g., in a multi-core configuration).

Processor 705 is operatively coupled to a communication interface 715, such that server computer device 701 is capable of communicating with a remote device such as another server computer device 701, slave unit 302, and multifactor authentication server 502. For example, communication interface 715 may receive weather information from computer devices connected to the master control unit 202 via the Internet.

Processor 705 may also be operatively coupled to a storage device 734. Storage device 734 is any computer-operated hardware suitable for storing and/or retrieving data, such as, but not limited to, data associated with a database. In some embodiments, storage device 734 is integrated in server computer device 701. For example, server computer device 701 may include one or more hard disk drives as storage device 734. In other embodiments, storage device 734 is external to server computer device 701 and may be accessed by a plurality of server computer devices 701. For example, storage device 734 may include a storage area network (SAN), a network attached storage (NAS) system, and/or multiple storage units such as hard disks and/or solid state disks in a redundant array of inexpensive disks (RAID) configuration.

In some embodiments, processor 705 is operatively coupled to storage device 734 via a storage interface 720. Storage interface 720 is any component capable of providing processor 605 with access to storage device 734. Storage interface 720 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 734.

Processor 705 executes computer-executable instructions for implementing aspects of the disclosure. In some embodiments, processor 705 is transformed into a special purpose microprocessor by executing computer-executable instructions or by otherwise being programmed. For example, processor 705 is programmed with the instructions such as are illustrated below.

FIG. 8 is a flow chart of a process for authenticating a user using the multifactor authentication system 410 shown in FIGS. 4 and 5. In other embodiments, process 800 is performed by dynamic multifactor authentication system 410 (shown in FIG. 4). In some embodiments, the steps of process 800 may be performed by one or more of the multifactor authentication server 502, the session token server 504, the biometric template server 506, and the token server 508 (all shown in FIG. 5).

In the exemplary embodiment, the dynamic multifactor authentication system 410 receives 805, from a user 601 (shown in FIG. 6), a request to access one or more protected computer systems, such as those in aircraft network 412 (shown in FIG. 4). The request contains authentication information 402 including a first authentication factor, such as biometric data 404, and a second authentication factor, such as token data 406 or password data 408. In some embodiments, the dynamic multifactor authentication system 410 and the aircraft network 412 are aboard an aircraft 110.

In the exemplary embodiment, the dynamic multifactor authentication system 410 retrieves 810 first factor authentication data associated with the user 601 from a first database storing a first plurality of authentication data associated with a first factor for authentication. In the exemplary embodiment, the first database is associated with the biometric template server 506. In some embodiments, the first plurality of authentication data stored in the first database is encrypted using a first encryption method. In some embodiments, the dynamic multifactor authentication system 410 encrypts the received first authentication factor using the first encryption method prior to the comparison. In other embodiments, the dynamic multifactor authentication system 410 decrypts the first factor authentication data prior to the comparison.

In some embodiments, the dynamic multifactor authentication system 410 includes a first authentication computer device associated with the first database. In some embodiments, the first authentication computer device is similar to the biometric template sever 506. The dynamic multifactor authentication system 410 compares 815 the first factor authentication data with the received first authentication factor 404 to determine if there is a match. In these embodiments, the biometric template server 506 performs the comparison of the first authentication factor and the first factor authentication data. The biometric template server 506 transmits the results of the comparison to the multifactor authentication server 502. In some further embodiments, the results solely include a pass or fail.

The dynamic multifactor authentication system 410 retrieves 820 second factor authentication data associated with the user 601 from a second database storing a second plurality of authentication data associated with a second factor of authentication. In the exemplary embodiment, the second database is associated with the token server 508. In some embodiments, the second plurality of authentication data stored in the second database is encrypted using a second encryption method. In some embodiments, the dynamic multifactor authentication system 410 encrypts the received second authentication factor using the second encryption method prior to the comparison. In other embodiments, the dynamic multifactor authentication system 410 decrypts the second factor authentication data prior to the comparison.

The dynamic multifactor authentication system 410 compares 825 the second factor authentication data with the received second authentication factor to determine if there is a match. In these embodiments, the token server 508 performs the comparison of the second authentication factor and the second factor authentication data. The token server 508 transmits the results of the comparison to the multifactor authentication server 502. In some further embodiments, the results solely include a pass or fail.

The dynamic multifactor authentication system 410 grants 830 access to the one or more protected computer systems if all of the comparisons match.

The dynamic multifactor authentication system 410 denies 835 access to the one or more protected computers systems if there is not a match for all of the comparisons.

In some embodiments, the request is received via a broadband powerline (BPL) connection 208 (shown in FIG. 2). In some further embodiments, the request originates from a ground-based modem, such as master control unit 202 (shown in FIG. 2).

In some embodiments, the dynamic multifactor authentication system 410 also includes a third database storing a plurality of user identifier information. In these embodiments, the request includes a first user identifier. The first database stores the first plurality of authentication data based on a second user identifier. The dynamic multifactor authentication system 410 retrieves, from the third database, the second user identifier based on the first user identifier. The first user identifier and the second user identifier are different. The dynamic multifactor authentication system 410 retrieves the first factor authentication data associated with the user based on the second user identifier.

In some further embodiments, the first authentication factor and the second authentication factor in the request are encrypted using a third encryption method. The dynamic multifactor authentication system 410 extracts the first authentication factor and the second authentication factor from the request. Then the dynamic multifactor authentication system 410 decrypts the first authentication factor and the second authentication factor prior to transmitting to either the biometric template server 506 or the token server 508.

At least one of the technical solutions to the technical problems provided by this system may include: (i) improved security systems; (ii) streamlined processes for authenticating users; (iii) increased difficulty for outside attackers due to encryption and separation of biometric and token data; (iv) tracking attackers and preventing their access to the system; and (v) increased security for aircraft systems.

The methods and systems described herein may be implemented using computer programming or engineering techniques including computer software, firmware, hardware, or any combination or subset thereof, wherein the technical effects may be achieved by performing at least one of the following steps: (a) receive, from a user, a request for access to one or more protected computer systems, where the request includes authentication information include a first authentication factor and a second authentication factor; (b) retrieve first factor authentication data associated with the user from a first database; (c) compare the first factor authentication data with the received first authentication factor to determine if there is a match; (d) retrieve the second factor authentication data associated with the user from a second database; (e) compare the second factor authentication data with the received second authentication factor to determine if there is a match; and (0 grant access to the one or more protected computer systems if all of the comparisons match.

Although described with respect to an aircraft broadband power line application, embodiments of the disclosure are also applicable to other vehicles such as ships, barges, and boats moored at a dock or pier and also wheeled vehicles parked in a service area.

The above-described methods and systems for transmitting power and digital communication to provide high speed Internet service support directly to the aircraft while at the gate are cost-effective, secure and highly reliable. The methods and systems include integration and use of BPL or X10 similar technology into the aircraft and airport infrastructure to support broadband Internet and data services to the aircraft with minimal infrastructure impacts and cost. The integration of BPL, X10, or similar technology into the airport and aircraft permit using the existing aircraft gate umbilical to provide the aircraft with high-speed and high reliability Internet and data services from the airport gate. Accordingly, the methods and systems facilitate transmitting power and digital communication in a secure, cost-effective, and reliable manner.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal As described above, the described embodiments enable secure vehicle broadband communication with a data network. More particularly, the present disclosure is directed to using broadband over powerline (BPL) communications to enable aircraft information exchange to occur at increased speeds and where conventional data exchange services may not be available. More specifically, a master control unit on the ground and a slave unit on the aircraft set-up a two-way communication channel over one or more powerlines and ensure the security and the integrity of the data being transferred over the powerline. The master control unit also ensures that the data is transmitted to its intended destination via the most efficient wireless network.

The above-described methods and systems for BPL communication are cost-effective, secure, and highly reliable. The methods and systems include detecting, via a BPL connection, a connection to a slave unit, receiving, via the BPL connection, a plurality of data from the slave unit, determining a destination for the plurality of data, comparing two or more transmission methods for transmitting the plurality of data to the destination, and transmitting the plurality of data to the destination via one of the two or more transmission methods based on the comparison. Accordingly, the methods and systems facilitate improving the use and efficiency of BPL communication by improving the BPL communication systems ability to communicate with outside systems that are incompatible with the 115 Vac, 400 Hz, three-phase power system.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for BPL communications. The system and methods described herein address that technical problem. The technical effect of the systems and processes described herein is achieved by performing at least one of the following steps: (a) detecting, via a BPL connection, a connection to a slave unit; (b) receiving, via the BPL connection, a plurality of data from the slave unit; (c) determining a destination for the plurality of data; (d) comparing two or more transmission methods for transmitting the plurality of data to the destination; and (e) transmitting the plurality of data to the destination via one of the two or more transmission methods based on the comparison. The resulting technical effect is communicating between BPL systems and other computer systems based on wireless communication bridges.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multifactor authentication system onboard an aerial vehicle comprising:
   at least one onboard processor;
   a first encrypted onboard database storing a first plurality of authentication data associated with a first factor for authentication and encrypted using a first encryption method; and
   a second encrypted onboard database storing a second plurality of authentication data associated with a second factor of authentication and encrypted using a second encryption method different from the first encryption method, wherein the first encrypted onboard database and the second encrypted onboard database are stored separately, wherein the first factor for authentication is different from the second factor for authentication, and wherein the first plurality of authentication data is different from the second plurality of authentication data,
   wherein the at least one processor is in communication with the first encrypted onboard database, the second encrypted onboard database, and one or more onboard protected computer systems, and wherein the at least one processor is programmed to:
      receive, from a user, a request for access to the one or more onboard protected computer systems including a first authentication factor, a second authentication factor, and an identifier associated with the user, wherein the identifier is different than the first authentication factor and the second authentication factor;

retrieve first factor authentication data associated with the user from the first encrypted onboard database based on the identifier;

compare the first factor authentication data with the received first authentication factor to determine when there is a first match;

retrieve the second factor authentication data associated with the user from the second encrypted onboard database based on the identifier;

compare the second factor authentication data with the received second authentication factor to determine when there is a second match; and grant access to the one or more onboard protected computer systems when all of the comparisons match.

2. The system in accordance with claim 1, wherein the at least one processor is further programmed to deny access to the one or more protected computers systems when there is not a match for all of the comparisons.

3. The system in accordance with claim 1, wherein the processor is further programmed to:

receive encrypted first factor authentication data that is encrypted using the first encryption method;

encrypt the received first authentication factor using the first encryption method prior to the comparison; and compare the encrypted received first authentication factor and the encrypted first factor authentication data.

4. The system in accordance with claim 3, further comprising a first authentication computer device associated with the first encrypted onboard database, wherein the first authentication computer device is programmed to:

perform the comparison of the encrypted first authentication factor and the encrypted first factor authentication data; and transmit the results of the comparison to the at least one processor.

5. The system in accordance with claim 1, wherein the processor is further programmed to:

receive encrypted second factor authentication data that is encrypted using the second encryption method;

encrypt the received second authentication factor using the second encryption method prior to the comparison; and compare the encrypted received second authentication factor and the encrypted second factor authentication data.

6. The system in accordance with claim 5, further comprising a second authentication computer device associated with the second encrypted onboard database, wherein the second authentication computer device is programmed to:

perform the comparison of the encrypted second authentication factor and the encrypted second factor authentication data; and transmit the results of the comparison to the at least one processor.

7. The system in accordance with claim 6, wherein the first encrypted onboard database resides on a first onboard server and the first plurality of authentication data associated with the first factor for authentication comprises encrypted token data, and the second encrypted onboard database resides on a second onboard server and the second plurality of authentication data associated with the second factor of authentication comprises encrypted biometric data, wherein the encrypted token data and encrypted biometric data are divided between the first onboard server and second onboard server such that a compromise of one onboard server will not enable access to both the encrypted token data and encrypted biometric data.

8. The system in accordance with claim 1, wherein the request, by the user, is received from a device that is not onboard the vehicle.

9. The system in accordance with claim 8, wherein the request is received via a broadband powerline (BPL) connection, and wherein the request originates from a ground-based modem.

10. The system in accordance with claim 1, wherein the multifactor authentication system and the one or more protected computer systems are aboard an aircraft.

11. The system in accordance with claim 1, further comprising a third database storing a plurality of user identifier information, wherein the identifier is a first user identifier, wherein the first database stores the first plurality of authentication data based on a second user identifier, and wherein the processor is further programmed to:

retrieve, from the third database, the second user identifier based on the first user identifier, wherein the first user identifier and the second user identifier are different; and retrieve the first factor authentication data associated with the user based on the second user identifier.

12. The system in accordance with claim 1, wherein the first authentication factor and the second authentication factor in the request are encrypted using a third encryption method different from the first encryption method and the second encryption method, and wherein the at least one processor is further programmed to:

extract the first authentication factor and the second authentication factor from the request; and decrypt the first authentication factor and the second authentication factor.

13. A multifactor authentication computer device onboard an aerial vehicle comprising:

at least one processor in communication with a first encrypted onboard database, a second encrypted onboard database, and one or more onboard protected computer systems, wherein the first encrypted onboard database stores a first plurality of authentication data associated with a first factor for authentication and encrypted using a first encryption method, wherein the second encrypted onboard database stores a second plurality of authentication data associated with a second factor of authentication and encrypted using a second encryption method different from the first encryption method, and wherein the first encrypted onboard database and the second encrypted onboard database are stored separately, and wherein the at least one processor is programmed to:

receive, from a user that is not onboard the vehicle, a request for access to the one or more protected computer systems including a first authentication factor, a second authentication factor, and an identifier associated with the user, wherein the identifier is different than the first authentication factor and the second authentication factor;

retrieve first factor authentication data associated with the user from the first encrypted onboard database based on the identifier;

compare the first factor authentication data with the received first authentication factor to determine when there is a first match;

retrieve the second factor authentication data associated with the user from the second encrypted onboard database based on the identifier, wherein the first factor for authentication is different from the second factor for authentication;

compare the second factor authentication data with the received second authentication factor to determine when there is a second match, wherein the first plurality of authentication data is different from the second plurality of authentication data; and grant access to the one or more onboard protected computer systems when all of the comparisons match.

14. The computer device in accordance with claim 13, wherein the at least one processor is further programmed to deny access to the one or more onboard protected computers systems when there is not a match for all of the comparisons.

15. The computer device in accordance with claim 13, wherein the processor is further programmed to:

receive encrypted first factor authentication data that is encrypted using the first encryption method;

encrypt the received first authentication factor using the first encryption method prior to the comparison; and compare the encrypted received first authentication factor and the encrypted first factor authentication data.

16. The computer device in accordance with claim 15, wherein the computer device is in communication with a first authentication computer device associated with the first encrypted onboard database, wherein the first authentication computer device is programmed to:

perform the comparison of the encrypted first authentication factor and the encrypted first factor authentication data; and transmit the results of the comparison to the at least one processor, wherein the results solely include a pass or fail.

17. The computer device in accordance with claim 13, wherein the processor is further programmed to:

receive encrypted second factor authentication data that is encrypted using the second encryption method;

encrypt the received second authentication factor using the second encryption method prior to the comparison; and compare the encrypted received second authentication factor and the encrypted second factor authentication data.

18. The computer device in accordance with claim 17, wherein the computer device is in communication with a second authentication computer device associated with the second encrypted onboard database, wherein the second authentication computer device is programmed to:

perform the comparison of the encrypted second authentication factor and the encrypted second factor authentication data; and transmit the results of the comparison to the at least one processor, wherein the results solely include a pass or fail.

19. The computer device in accordance with claim 13, wherein the request is received via a broadband powerline (BPL) connection, wherein the request originates from a ground-based modem, and wherein the multifactor authentication computer device and the one or more protected computer systems are aboard an aircraft.

20. A method for authenticating a user, the method performed by at least one processor onboard an aerial vehicle in communication with at least one memory device, the method comprising:

receiving, from a user, a request to access one or more protected computer systems including a first authentication factor, a second authentication factor, and an identifier associated with the user, wherein the identifier is different than the first authentication factor and the second authentication factor;

retrieving first factor authentication data associated with the user from a first encrypted onboard database based on the identifier, the first encrypted onboard database storing a first plurality of authentication data associated with a first factor for authentication and encrypted using a first encryption method;

comparing, via an onboard multifactor authentication system, the first factor authentication data with the received first authentication factor to determine when there is a first match;

retrieving second factor authentication data associated with the user from a second encrypted onboard database based on the identifier, the second encrypted onboard database storing a second plurality of authentication data associated with a second factor of authentication and encrypted using a second encryption method different from the first encryption method, wherein the first onboard database and the second onboard database are stored separately, and wherein the first factor for authentication is different from the second factor for authentication;

comparing, via an onboard multifactor authentication system, the second factor authentication data with the received second authentication factor to determine when there is a second match, wherein the first plurality of authentication data is different from the second plurality of authentication data;

granting access to the one or more onboard protected computer systems when all of the comparisons match; and denying access to the one or more onboard protected computers systems when there is not a match for all of the comparisons.

* * * * *

UNITED STATES PATENT AND TRADEMARK OFFICE
CERTIFICATE OF CORRECTION

| | |
|---|---|
| PATENT NO. | : 11,323,435 B2 |
| APPLICATION NO. | : 16/406958 |
| DATED | : May 3, 2022 |
| INVENTOR(S) | : Sopheap Ya |

It is certified that error appears in the above-identified patent and that said Letters Patent is hereby corrected as shown below:

In the Specification

In Column 18, Line 49, delete "(0" and insert therefor -- (f) --.

Signed and Sealed this
Thirteenth Day of September, 2022

*Katherine Kelly Vidal*

Katherine Kelly Vidal
*Director of the United States Patent and Trademark Office*